May 19, 1931.  F. A. VESELKA  1,806,376
COTTON CHOPPER
Filed May 29, 1930  2 Sheets-Sheet 1
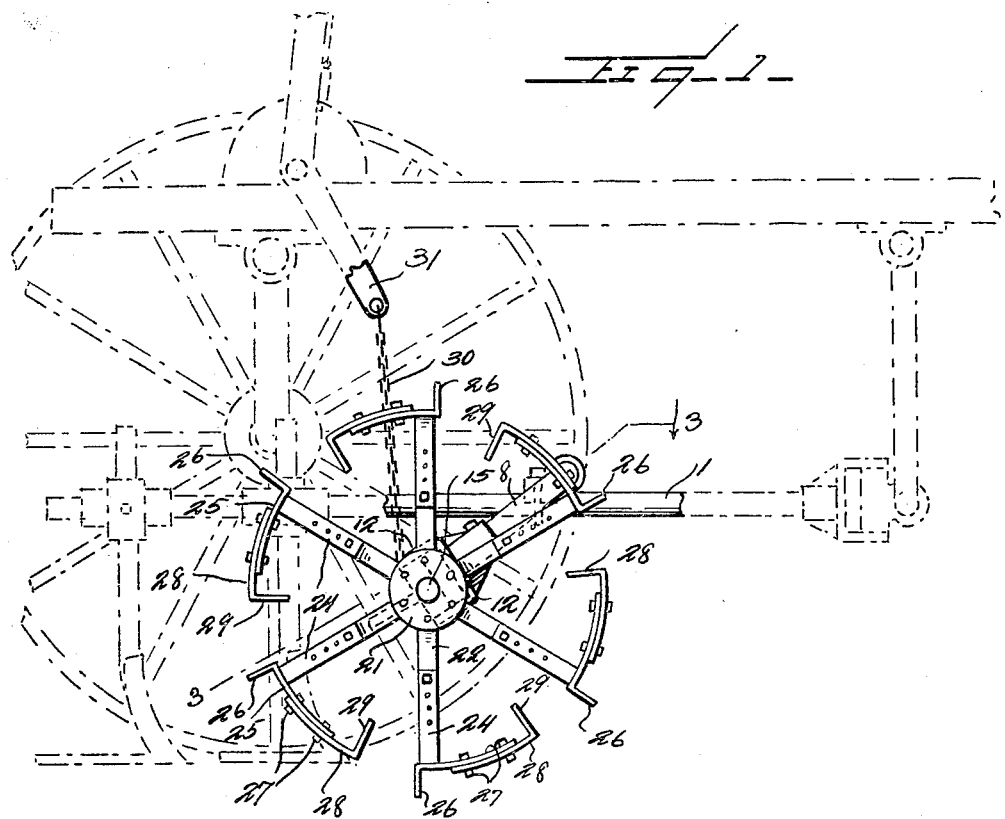
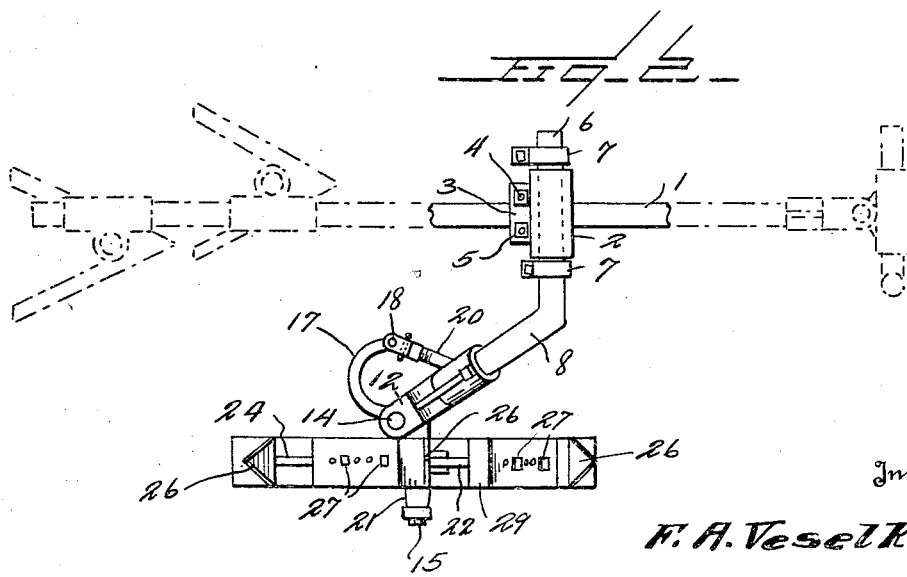
Inventor
F. A. Veselka
By Watson E. Coleman
Attorney May 19, 1931.  F. A. VESELKA  1,806,376
COTTON CHOPPER
Filed May 29, 1930   2 Sheets-Sheet 2
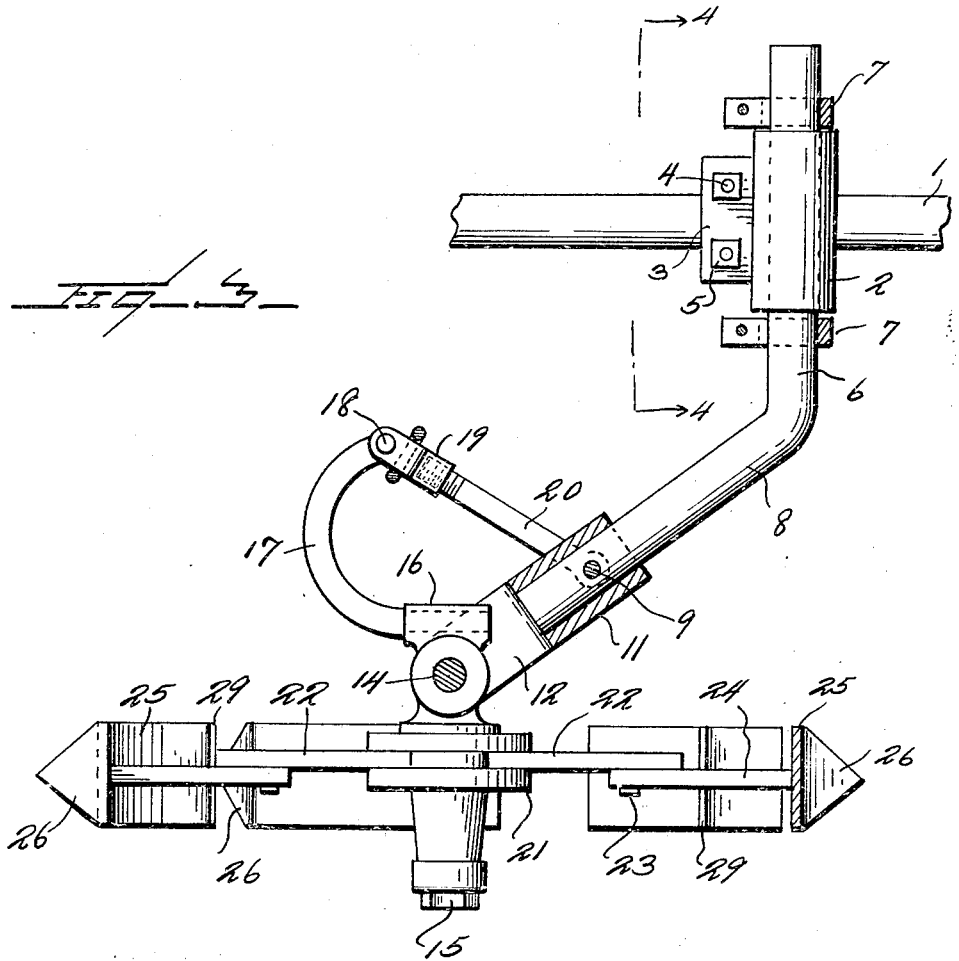
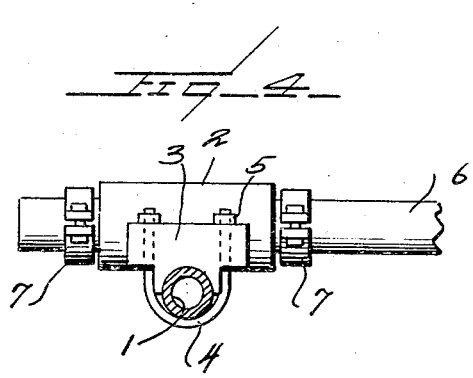
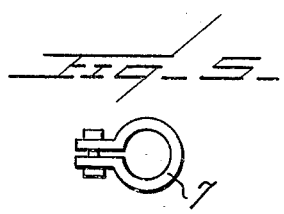
Inventor
F. A. Veselka
By Watson E. Coleman
Attorney Patented May 19, 1931

1,806,376

UNITED STATES PATENT OFFICE

FRANK A. VESELKA, OF MART, TEXAS

COTTON CHOPPER

Application filed May 29, 1930. Serial No. 457,402.

This invention relates to a cotton chopper, and it is an object of the invention to provide a device of this kind which can be readily and conveniently employed with a cultivator of ordinary or general construction and which operates effectively to thin out or chop cotton upon travel of the cultivator, thus avoiding the manual labor now generally required to do work of this kind.

Another object of the invention is to provide a device of this kind which comprises a plurality of cutting members revolving about a common axis, together with means whereby the device is caused to have proper travel along a plant row.

The invention consists in the details of construction and in the combination and arrangement of the several parts of my improved cotton chopper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a cotton chopper constructed in accordance with an embodiment of my invention and in applied position, the associated cultivator being diagrammatically indicated by broken lines;

Figure 2 is a view in top plan of the device as illustrated in Figure 1 with a portion of the cultivator also indicated by broken lines;

Figure 3 is an enlarged detail sectional view taken substantially on the line 3—3 of Figure 1;

Figure 4 is a fragmentary view partly in section and partly in elevation of certain of the features herein disclosed, the section being taken substantially on the line 4—4 of Figure 3;

Figure 5 is a view in elevation of one of the holding clamps as herein employed.

As disclosed in the accompanying drawings, 1 denotes a conventional beam comprised in a wheel cultivator of the general type and with which my improved cotton chopper is associated. Resting upon the beam 1 at a predetermined point thereof and disposed transversely thereof is a sleeve 2. This sleeve 2 substantially midway its ends is provided to one side thereof with a block 3 which serves as a saddle and has direct contact from above with the beam 1. Coacting with this block or saddle 3 is a V-clamping member 4 engaging the beam 1 from below and having coacting with its extremities the holding nuts 5 which contact with the block or saddle 3 from above.

The sleeve 2 serves as a bearing or support for a rod or shaft 6 adapted to rotate within the sleeve 2, and fixed to this rod or shaft 6 at opposite sides of the sleeve 2 are the split clamping members 7 which serve as thrust bearings to limit the endwise movement of the rod or shaft 6 through the sleeve 2.

By loosening the clamping members 7 the rod or shaft 6 may be adjusted lengthwise with respect to the sleeve 2 and after the desired selective adjustment has been accomplished, the clamping members 7 are then tightened in proper position upon the rod or shaft 6.

The rod or shaft 6 is continued by an angularly related extension rod or arm 8, the free or outer extremity of which having keyed thereto by the pin 9 a collar 11. The outer portion of the collar 11 is provided with the spaced arms 12 to which is operatively engaged, by the pin 14 or the like, the inner end portion of a spindle 15. This inner portion of the spindle 15 has operatively secured thereto, as at 16, a curved arm 17, the outer end portion of which being pivotally connected, as at 18, with a collar 19 threaded upon a rod 20. This rod 20 in turn is in pivotal connection with the pin 9 hereinbefore referred to. By adjusting the collar 19 lengthwise of the rod 20 the spindle 15 may be held in desired selective position around the bolt 14 so that in the application of the device to the cultivator it will be assured that the chopper will have proper travel along a plant row.

Mounted upon the spindle 15 and held thereto in any desired manner is a hub 21 from which radiate the arms 22. These arms 22 have adjustably connected thereto, as at 23, the outer arms 24, said arms 24 when applied being substantially coplanar with the arms 22. Fixed to the outer end of each of the arms 24 is an arcuate member or plate 25 provided at one end with an outstanding and substantially radial blade 26 which serves to cut, split or lift the cotton plants as the same travels over a plant row.

Bolted as at 27 to the opposite end portion of the plate 25 is a second arcuate plate 28 which has its outer end terminating in an inwardly disposed and substantially radial plate or guard 29 which serves to protect the plants left in the row from the soil set in motion by the blades or sweeps 26.

Also engaged with the pin 9 or otherwise as may be preferred is an end portion of a flexible member or chain 30 which is also suitably anchored to a lever operated rock arm 31 carried by the cultivator proper. Upon manipulation of this lever operated arm 31 the cotton chopper proper may be raised or lowered as desired.

It will be understood that the plates or guards 29 instead of being substantially radial as shown in Figure 1 may be inclined at a lesser degree as it has been found in practice that such guards or plates are particularly effective when disposed at an angle between sixty and sixty-five degrees.

From the foregoing description it is thought to be obvious that a cotton chopper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A cotton chopper comprising a plurality of arms, means for connecting said arms for rotation around a common center, a plate carried by the outer end portion of each of the arms and providing an outstanding cutting blade at one extremity, and an inwardly disposed guard plate carried by said first named plate at the opposite extremity thereof.

2. A cotton chopper comprising an arm, means for supporting the same for rocking movement, a spindle in pivotal connection with said arm, an arm extending from the spindle, a rod pivotally connected with the first arm, a nut threaded upon said rod and with which the second arm is pivotally connected, and a chopper member mounted on the spindle.

3. A cotton chopper comprising an arm, means for supporting the same for rocking movement, a spindle in pivotal connection with said arm, an arm extending from the spindle, a rod pivotally connected with the first arm, a nut threaded upon said rod and with which the second arm is pivotally connected, a chopper member mounted on the spindle, and means for raising the spindle.

4. A cotton chopper comprising an arm, means for supporting the same for rocking movement, a spindle in pivotal connection with said arm, an arm extending from the spindle, a rod pivotally connected with the first arm, a nut threaded upon said rod and with which the second arm is pivotally connected, a chopper member mounted on the spindle, means for supporting the spindle for swinging movement in substantially a horizontal direction, and means for holding the spindle against such swinging movement when in desired selective adjustment.

In testimony whereof I hereunto affix my signature.

FRANK A. VESELKA.